Patented June 21, 1938

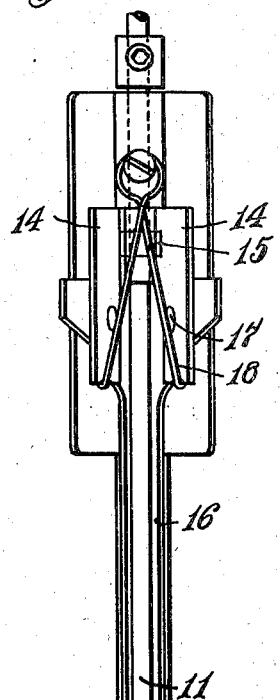
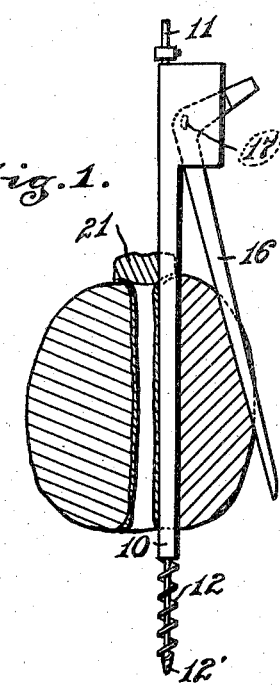
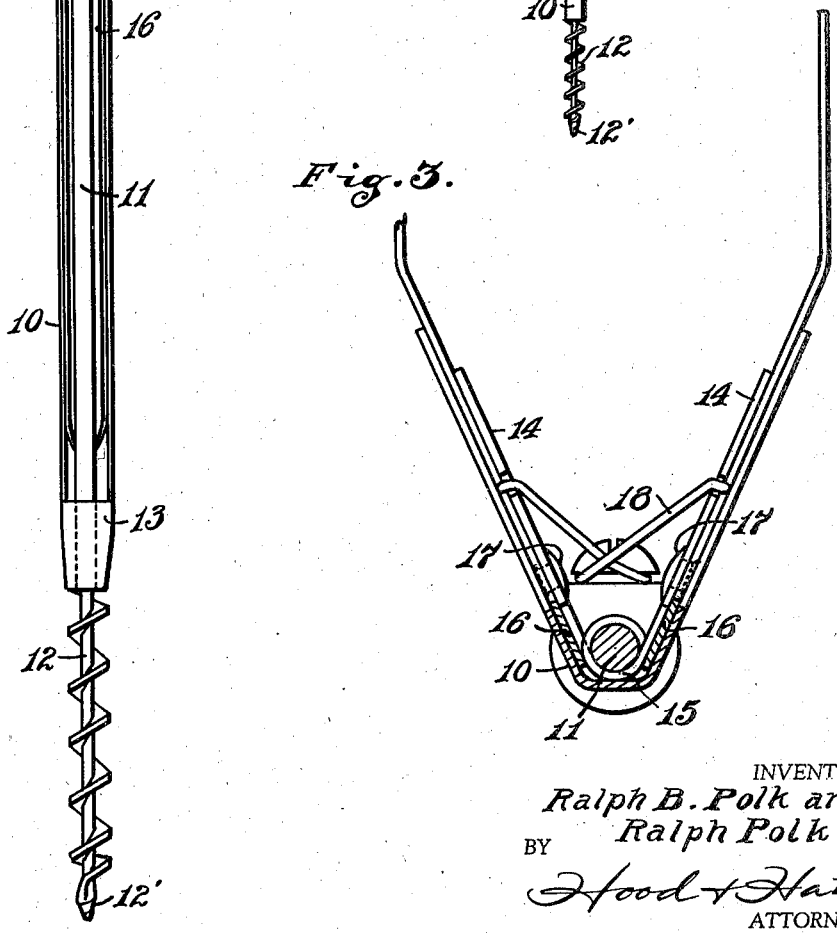

2,121,097

UNITED STATES PATENT OFFICE 2,121,097

METHOD OF SEGREGATING INTEGUMENT-FREE FRUIT SEGMENTS

Ralph B. Polk and Ralph Polk, Jr.
Haines City, Fla.

Application August 2, 1935, Serial No. 34,345

8 Claims. (Cl. 146—3)

Citrus fruits, such as grapefruit, comprise a central meat body composed of a group of meat segments each enclosed in a tough, inedible integument in the form of a segment of an approximate sphere, grouped about an inedible core and encased in an integral skin. In many varieties, each of said integuments encloses a closely compacted group of seeds, midway of the polar dimension of the segment and the number of such segments, in individual grapefruits, varies usually from eleven to fifteen.

The object of our present invention is to provide an improved method of manipulating such fruits whereby substantially whole unbroken meat segments may be more efficiently segregated free from integuments and seeds.

To this end we first remove the skin, and preferably simultaneously also remove the subjacent circumferential portions of the segmental integuments.

With some fruits we have found it desirable to leave undisturbed a "button" of the skin at the stem end of the fruit, said "button" having a radius about equal to or slightly greater than the lesser radial spacing of the seed groups and slightly exceeding the radial distance of the apices of the integuments from the polar axis of the fruit so that said "button" will serve to hold together the group of integuments at the stem end. The entire skin, however, may be removed.

Thereupon, we remove, or break down, apices of the meat segments between the radial integuments, without substantial disturbance of the remaining major part of said integuments, to afford convenient entry of stripper elements between the meat segments and the adherent radial integuments. Where seeds are present the seed groups are disintegrated and the major number of seeds extracted polarwise from the fruit without substantial rupture or disturbance of the radial integuments, this also for the purpose of ready entry of stripper elements into the apex of the included angle between companion radial integuments.

Thereafter we separate the radial integument walls from the meat by first inserting a stripping implement in the space created at the apex between the radial integuments and in the plane between the radial integument and the meat lengthwise of the polar diameter and thereafter move said implement substantially radially outwardly to strip the integument from the meat.

Preferably two of such implements are simultaneously projected into and through the fruit polarwise and then radially outwardly between the meat and adherent radial integuments so that, as said implements emerge at the periphery of the meat body, the free meat body is ejected radially.

To facilitate the practice of the above-described method we have provided a new implement, which forms part of the subject matter of our copending application Serial No. 34,349, illustrated in the accompanying drawing, wherein, Fig. 1 is a side elevation of the implement inserted in a peeled fruit;

Fig. 2 is a front elevation of the implement; and

Fig. 3 is a transverse section of the implement, on a larger scale.

In the drawing 10 indicates a V-shaped main body or finger, the wings of which are considerably narrower than the radial extent of the meat enclosing integuments in the fruit to be worked upon.

Journalled in the apex of finger 10 is a shaft 11 which, at its lower end, beyond the tip of finger 10, bears an auger 12 having a tapered but blunt tip 12'.

Shaft 11, with its auger 12 is to be rotated at desired speed, by any suitable means.

Immediately back of auger 12, the side walls of finger 10 are bridged by a wall 13, and beyond this wall, between the side walls of the finger, are two carrier plates, or wings, 14, 14, hinged upon shaft 11 at 15. Pivoted, or otherwise mounted upon each of plates 14 for relative outward movement, is a stripping blade 16. In the drawing each of these blades is shown as pivoted to its carrier plate 14, at 17, so that the free end of the stripper blade may be swung outwardly from the apex of the finger 10.

The two plates 14 (with the stripper blades carried thereby) are normally spread apart to their limit of outward movement by a light spring 18.

The forward edges of the stripper blades should not be sharp enough to cut the fruit integuments and the tips of these blades, at the time of polar insertion into the fruit, lie behind the rear end of wall 13.

Using the above-described implement, our method is performed as follows:—

The fruit having been peeled as described above, the tip of auger 12 is projected polarwise, preferably at the stem end of the fruit, into a meat segment adjacent the vertex of an integument and with the auger in rotation. As the auger penetrates the segment substantially parallel with the polar axis of the fruit, it produces a passage polarwise through the fruit between companion radial integuments, at the apex of the included angle, without rupture of the integuments and without rupture of the cohesive bond between integuments of adjacent segments. If seeds are present in the fruit, the auger disintegrates the seed group and extracts some or all of the seeds polarwise of the fruit.

Proceeding further, finger 10 and the stripping blades penetrate the fruit until the free ends of the stripper blades emerge at the farther pole.

As the blades are not sharp edged the radial integuments of the fruit segments automatically angularly set the blades in accordance with the angular positions of the integuments.

When penetration has been completed the stripper blades are moved outwardly, thereby exerting a substantially radial force upon the integuments and encased meat in the cohesion planes, to separate integument from meat and finally, as the blades emerge from the periphery of the fruit, to radially eject the freed meat.

As the auger proceeds between the radial integuments it is automatically centralized and spring 18 serves to hold each stripper blade close to the adjacent integument. It will be noted that the seeds are withdrawn polarwise from the fruit while the associated fruit segment is firmly held by the adherent radial integuments and that the entire group of these integuments is held against radial displacement by the skin "button" 21, if present, and by the tines of the holding fork.

The method which we have described, because of preliminary polarwise penetration of the fruit in the apices of the included angles of the integuments, and seed removal prior to integument disturbance, may be simultaneously practiced on a major number of segments of a fruit without increasing danger of breakage of the segregated meats and may therefore be practiced mechanically at a relatively high rate of speed by properly designed mechanism such as is disclosed in our above-mentioned application.

Where a "button" 21 of the external peel or rind has been retained in place at the stem pole of the fruit, it serves to resist, to some degree, relative radial displacement of the integuments of the meat segments.

We claim as our invention:

1. That improvement in the art of segregating nature-formed fruit-segments, which includes the step of creation of a void polarwise of the whole fruit between divergent integuments at the apex of individual segments without substantial disturbance of the wider outer portion of the meat segment and without substantial rupture of the natural bond between the apices of adjacent integuments and the immediately adjacent integuments.

2. That improvement in the art of segregating nature-formed fruit-segments, which includes the step of creation of a void polarwise of the whole fruit between divergent integuments at the apex of individual segments without substantial disturbance of the wider outer portion of the meat segment and without substantial rupture of the natural bond between the apices of adjacent integuments and the immediately adjacent integuments, and the subsequent step of separating the first-mentioned integuments from their enclosed meat segment by a substantially radial force applied in the radial plane between the adhering faces of integument and meat.

3. That improvement in the art of segregating nature-formed fruit segments, which includes the step of extraction of seeds polarwise without substantial rupture of and between apex portions of the segment integuments followed by the step of separation of radial integuments from the meat by a force having a radial component and in the radial plane between meat and adjacent adhering integument.

4. That improvement in the art of segregating substantially whole nature-formed fruit segments, which includes, the step of removal from a whole fruit of the major portion of the skin and subjacent portions of the meat-enclosing integuments without disturbance of a polar zone at the stem end overlying the apices of said integuments; the step of extraction of seeds polarwise without substantial rupture of apex portions of the individual segment integuments and without substantial rupture of the natural bond between the integuments of adjacent segments.

5. That improvement in the art of segregating nature-formed fruit segments, which includes, the step of removal of skin and subjacent portions of the meat-enclosing integuments without disturbance of a polar zone at the stem end overlying the apices of said integuments; the step of extraction of seeds polarwise without substantial rupture of apex portions of the segment integuments followed by the step of separation of radial integuments from the meat by a force having a radial component and in the radial plane between meat and adjacent integuments.

6. That improvement in the art of segregating nature-formed fruit segments, which includes the step of removal from the major portion of the fruit of the external skin and subjacent circumferential portions of the segment integuments and retention of a polar button of said skin and subjacent integuments, the step of perforation of the fruit polarwise by the obliteration of fruit cells in apices of the meat segments without substantial destruction or disturbance and without disturbance of the natural bond between adjacent radial integuments.

7. That improvement in the art of segregating nature-formed fruit segments, which includes the step of removal from the major portion of the fruit of the external skin and subjacent circumferential portions of the segment integuments and retention of a polar button of said skin and subjacent integuments, the step of perforation of the fruit polarwise by the obliteration of fruit cells in apices of the meat segments without substantial destruction or disturbance and without disturbance of the natural bond between adjacent radial integuments, and the step of polarwise removal of seeds from between radial integuments.

8. That improvement in the art of segregating nature-formed integument-defined fruit segments, which comprises the step of removing the skin of the whole fruit leaving the natural bond between the segment integuments undisturbed, and the step of propelling the seeds polarwise from the interior of the fruit segments between the radial portions of the segment integuments by creating voids polarwise only between said radial portions and simultaneously propelling the seeds polarwise out of the fruit.

RALPH B. POLK.
RALPH POLK, Jr.